(12) United States Patent
Martin et al.

(10) Patent No.: US 11,044,657 B2
(45) Date of Patent: Jun. 22, 2021

(54) COMMUNICATIONS DEVICE, INFRASTRUCTURE EQUIPMENT, WIRELESS COMMUNICATIONS NETWORK AND METHODS

(71) Applicant: Sony Corporation, Tokyo (JP)

(72) Inventors: Brian Alexander Martin, Basingstoke (GB); Shin Horng Wong, Basingstoke (GB); Vivek Sharma, Basingstoke (GB); Martin Warwick Beale, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 57 days.

(21) Appl. No.: 16/608,195

(22) PCT Filed: Mar. 9, 2018

(86) PCT No.: PCT/EP2018/055921
§ 371 (c)(1),
(2) Date: Oct. 25, 2019

(87) PCT Pub. No.: WO2018/197092
PCT Pub. Date: Nov. 1, 2018

(65) Prior Publication Data
US 2021/0112473 A1    Apr. 15, 2021

(30) Foreign Application Priority Data
Apr. 27, 2017 (EP) .................................. 17168564

(51) Int. Cl.
*H04W 4/00* (2018.01)
*H04W 36/30* (2009.01)
*H04W 24/08* (2009.01)

(52) U.S. Cl.
CPC .......... *H04W 36/30* (2013.01); *H04W 24/08* (2013.01)

(58) Field of Classification Search
CPC .............................. H04W 36/30; H04W 24/08
(Continued)

(56) References Cited

U.S. PATENT DOCUMENTS 6,751,187 B2 * 6/2004 Walton .................. H04L 1/0009
370/210
9,813,965 B1 * 11/2017 Edara ..................... H04W 48/16
(Continued)

FOREIGN PATENT DOCUMENTS

EP          3142418 A     3/2017
WO    2015/176782 A1    11/2015
(Continued)

OTHER PUBLICATIONS

International Search Report and Written Opinion dated May 14, 2018 for PCT/EP2018/055921 filed on Mar. 9, 2018, 10 pages.
(Continued)

*Primary Examiner* — Thai D Hoang
(74) *Attorney, Agent, or Firm* — Xsensus LLP

(57) ABSTRACT

A method of performing cell reselection by a wireless communications device comprises measuring a signal strength of radio signals received from a serving cell, determining whether the signal strength of the signals received from the serving cell is lower than a first predetermined signal strength threshold, if the signal strength is lower than the first predetermined signal strength threshold measuring a signal strength of a neighbor cell operating on the same frequency as the serving cell to generate signal strength measurements at a first rate, and in accordance with the signal strength measurements of the neighbor cell generated at the first rate determining whether to reselect to the neighbor cell.

19 Claims, 7 Drawing Sheets

(58) Field of Classification Search
USPC .......................... 370/331–334; 455/436–444
See application file for complete search history.

(56) References Cited

U.S. PATENT DOCUMENTS

| | | | | |
|---|---|---|---|---|
| 10,708,942 | B2* | 7/2020 | Lee | H04W 72/0406 |
| 2005/0041618 | A1* | 2/2005 | Wei | H04L 1/0026 |
| | | | | 370/328 |
| 2005/0272425 | A1* | 12/2005 | Amerga | H04W 48/16 |
| | | | | 455/436 |
| 2008/0233955 | A1* | 9/2008 | Narang | H04W 48/16 |
| | | | | 455/434 |
| 2009/0247181 | A1* | 10/2009 | Palanki | H04W 72/082 |
| | | | | 455/452.2 |
| 2011/0151827 | A1* | 6/2011 | Snider | B60R 25/00 |
| | | | | 455/404.1 |
| 2011/0269449 | A1* | 11/2011 | Kazmi | H04B 7/024 |
| | | | | 455/422.1 |
| 2012/0155362 | A1* | 6/2012 | Montojo | H04H 20/71 |
| | | | | 370/312 |
| 2013/0095829 | A1* | 4/2013 | Bhattad | H04W 36/0085 |
| | | | | 455/434 |
| 2013/0024277 | A1 | 9/2013 | Wang et al. | |
| 2014/0036667 | A1* | 2/2014 | Balasubramanian | H04L 47/26 |
| | | | | 370/230 |
| 2014/0160953 | A1* | 6/2014 | Chappel | H04L 43/00 |
| | | | | 370/252 |
| 2017/0134109 | A1* | 5/2017 | Hwang | H04J 11/0033 |
| 2017/0134150 | A1* | 5/2017 | Hwang | H04L 5/0055 |
| 2017/0279487 | A1* | 9/2017 | Kazmi | H04W 48/00 |

FOREIGN PATENT DOCUMENTS

| | | | | |
|---|---|---|---|---|
| WO | 2015/190967 A1 | 12/2015 | | |
| WO | WO-2018197092 A1 * | 11/2018 | ............ | H04W 24/10 |

OTHER PUBLICATIONS

Holma, H., and Toskala, A., "LTE for UMTS: OFDMA and SC-FDMA Based Radio Access," System Architecture Based on 3GPP SAE, John Wiley & Sons, Ltd., 2009, 10 pages.

3GPP, "3rd Generation Partnership Project; Technical Specification Group Radio Access Network; Evolved Universal Terrestrial Radio Access (E-UTRA); User Equipment (UE) procedures in idle mode," Release 14, 3GPP TS 36.304 V14.2.0, Mar. 2017, pp. 1-49.

Ericsson, "Measurements and considerations for cell reselection for NB-IoT," 3GPP TSG-RAN WG4 No. 77AH NB-IoT, R4-77 AH-IoT-0065, Budapest, Hungary, Jan. 20-22, 2016, 3 pages.

CMCC, "Cell reselection issue for NB-IoT," 3GPP TSG-RAN WG2 Meeting No. 97, R2-1702929, Athens, Greece, Feb. 13-17, 2017, 2 pages.

Ericsson, "Email report [97bis#31][NB-IoT] Cell Reselection for NB-IoT," 3GPP TSG-RAN2 meeting No. 98, R2-1705031, Hangzhou, China, May 15-19, 2017, 17 pages.

* cited by examiner

COMMUNICATIONS DEVICE, INFRASTRUCTURE EQUIPMENT, WIRELESS COMMUNICATIONS NETWORK AND METHODS

CROSS-REFERENCE TO RELATED APPLICATIONS

The present application is based on PCT filing PCT/EP2018/055921, filed Mar. 9, 2018, which claims priority to EP 17168564.7, filed Apr. 27, 2017, the entire contents of each are incorporated herein by reference.

BACKGROUND

Field of Disclosure

The present disclosure relates to communications devices, which are configured to reselect a cell of a wireless communications network for receiving and/or transmitting data, and methods of performing cell reselection.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation wireless communications systems, such as those based on the third generation project partnership (3GPP) defined UMTS and Long Term Evolution (LTE) architecture are able to support sophisticated services such as instant messaging, video calls as well as high speed internet access. However, recent development efforts have focussed on the support of communications to and from a much wider range of devices, including reduced complexity devices, machine type communication devices, devices which require little or no mobility, high resolution video displays and virtual reality headsets.

A current technical area of interest to those working in the field of wireless and mobile communications is known as "The Internet of Things" or IoT for short. The 3GPP has proposed to develop technologies for supporting narrow band (NB)-IoT using an LTE or 4G wireless access interface and wireless infrastructure. Such IoT devices are expected to be low complexity and inexpensive devices requiring infrequent communication of relatively low bandwidth data. Although many such NB-IoT devices may be deployed indoors and/or in remote locations making radio communications challenging, others may be required to operate in use cases where they move over time, for example, to report the location or status of an object to which they are attached or in which they are embedded.

Various procedures are known for supporting mobility-related requirements of communications devices which transmit or receive data using radio signals with a wireless communications network. Cell reselection is one such procedure, whereby a communications device's serving cell is changed from one cell to another. Cell reselection typically relies on the device performing measurements of neighbour cells which may be candidates to be selected as the next serving cell. Cell reselection may also improve the efficiency of the network as a whole, since it can ensure that a device is served by the most appropriate cell, such that lower levels of interference may be experienced by wireless devices and base stations.

Performing neighbour cell measurements by a communications device consumes energy. As such there is a trade-off between a requirement for power efficiency, which is improved by reducing a rate at which measurements are performed, and a need to serve effectively communications devices which may move, which would require a higher rate of performing measurements. In order to provide economies of scale in the manufacture and production of wireless communication devices, there is further a desire to provide a common solution which is applicable to, and meets the needs of, wireless communications devices, whether it is to be ultimately deployed in a fixed location or to be mobile.

There is therefore a desire to provide an improved means of cell reselection which resolves these trade-offs.

SUMMARY OF THE DISCLOSURE

According to one example embodiment of the present technique, there is provided a method of performing cell reselection by a wireless communications device. The method comprises measuring a signal strength of radio signals received from a serving cell, determining whether the signal strength of the signals received from the serving cell is lower than a first predetermined signal strength threshold, if the signal strength is lower than the first predetermined signal strength threshold measuring a signal strength of a neighbour cell operating on the same frequency as the serving cell to generate signal strength measurements at a first rate, and in accordance with the signal strength measurements of the neighbour cell generated at the first rate determining whether to reselect to the neighbour cell. In accordance with the present technique, if the signal strength of the signals received from the serving cell is greater than the first predetermined signal strength threshold and the radio signals received from the serving cell satisfy one or more predetermined conditions based on at least one of the measured signal strength of the signals received from the serving cell and a measured signal quality of the signals received from the serving cell, measuring the signal strength of the radio signals received from the neighbour cell to generate signal strength measurements at a second rate, and in accordance with the signal strength measurements generated at the second rate of the neighbour cell determining whether to reselect to the neighbour cell. In some examples, the second rate of generating the signal strength measurement of the signals received from the neighbouring cell may be less than or equal to the first rate, As a result a communications device can adapt a rate of measuring signal strength measurements of a neighbouring cell in accordance with as strength of signals received from a serving cell.

Embodiments of the present technique can provide an arrangement in which a communications device is configured to evaluate more efficiently a neighbouring cell with respect to a serving cell for performing a cell reselection procedure by adapting a rate at which measurements are performed of the neighbouring cell in accordance with a set of predetermined conditions with respect to signals received from the serving cell.

Further respective aspects and features are defined by the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Conventional Communications System

Figure 1:
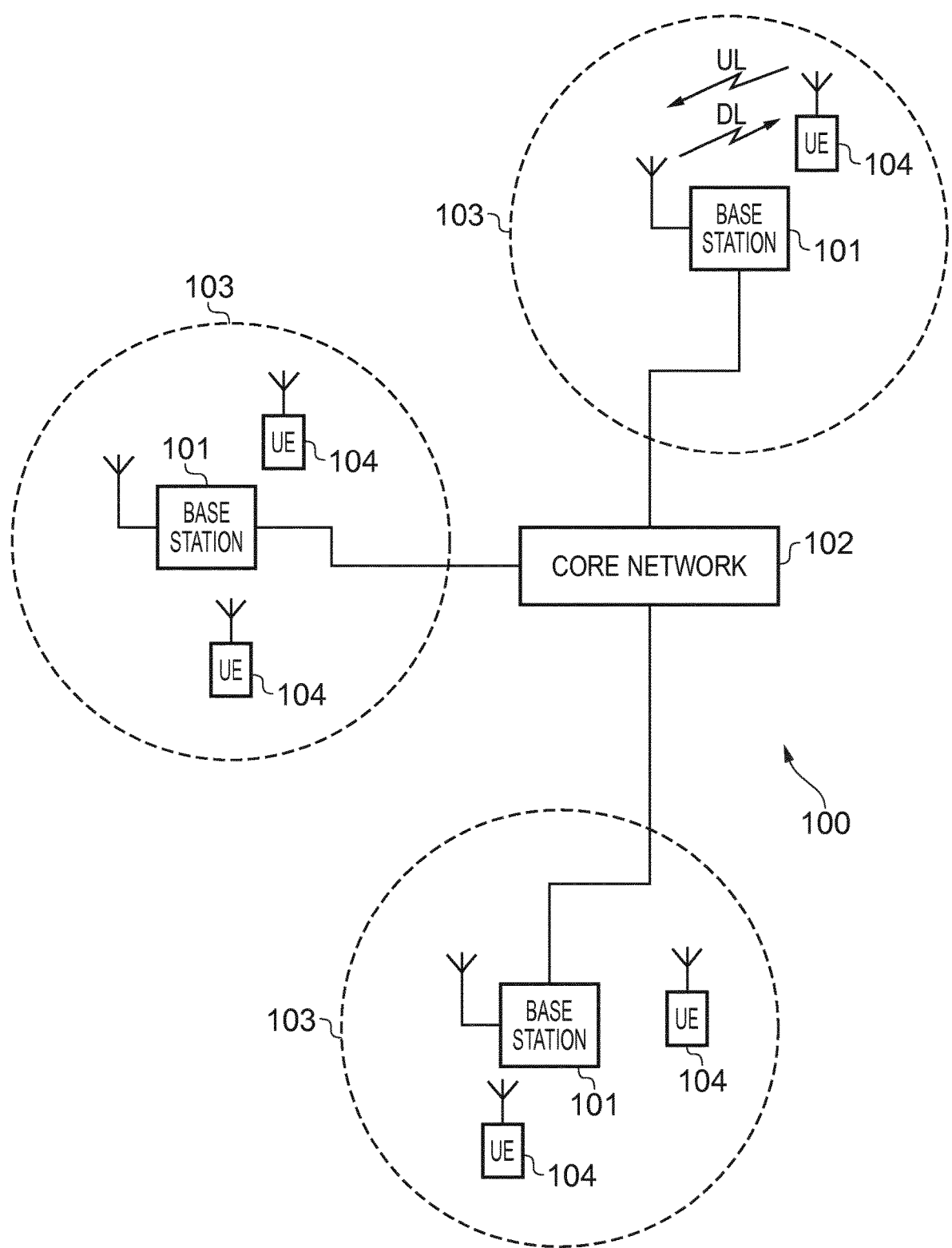
FIG. 1 is a schematic block diagram illustrating an example of a mobile telecommunication system.

FIG. 1 provides a schematic diagram illustrating some basic functionality of a mobile telecommunications network/system 100 operating in accordance with LTE principles and which may be adapted to implement embodiments of the disclosure as described further below. Various elements of FIG. 1 and their respective modes of operation are well-known and defined in the relevant standards administered by the 3GPP® body, and also described in many books on the subject, for example, Holma H. and Toskala A [1]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from communications devices 104. Data is transmitted from base stations 101 to communications devices 104 within their respective coverage areas 103 via a radio downlink. Data is transmitted from communications devices 104 to the base stations 101 via a radio uplink. The uplink and downlink communications may be made using radio resources that are licenced for exclusive use by the operator of the network 100. The core network 102 routes data to and from the communications devices 104 via the respective base stations 101 and provides functions such as authentication, mobility management, charging and so on. Communications devices may also be referred to as mobile stations, user equipment (UE), user device, mobile radio, and so forth. Base stations may also be referred to as transceiver stations/NodeBs/eNodeBs (eNB for short), and so forth.

Wireless communications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink. Other examples of wireless communications systems include those operating in accordance with 5G in which a radio network is formed by infrastructure equipment referred to as wireless transceiver units.

Embodiments of the present technique can provide an arrangement in which a communications device is configured to more efficiently evaluate a neighbour cell and to select the neighbour cell by adapting the rate at which measurements are performed of the neighbour cell in accordance with a set of predetermined conditions with respect to signals received from a serving cell. In particular the present invention for example is configured to provide a more efficient technique for allowing a communications device to perform cell reselection in a situation where the communications device may be disposed indoors in which it is attached to a relatively weak serving cell and may proceed to move out of doors in which case it receives an increase in signal strength from a neighbour cell and by configuring the rate of measurements of the neighbour cell to be adapted in accordance with a relative threshold to the serving cell a communications device can sample the signal strength of neighbour cells in a way which utilises unavailable power of the communications device in a more efficient way.

Embodiments of the present technique therefore relate to a mode in which a communications device is for example in an idle mode in which it performs cell reselection in order to attach to a cell or infrastructure equipment such as an eNB in order to receive downlink signals when these are to be transmitted to the communications device. Accordingly the communications device selects a cell or reselects a cell based upon a relate quality of signals received from the available cells and therefore clamps on to the cell so that the communications device can transition to an active mode for example in order to transmit or receive data from the wireless communications network.

Figure 2:
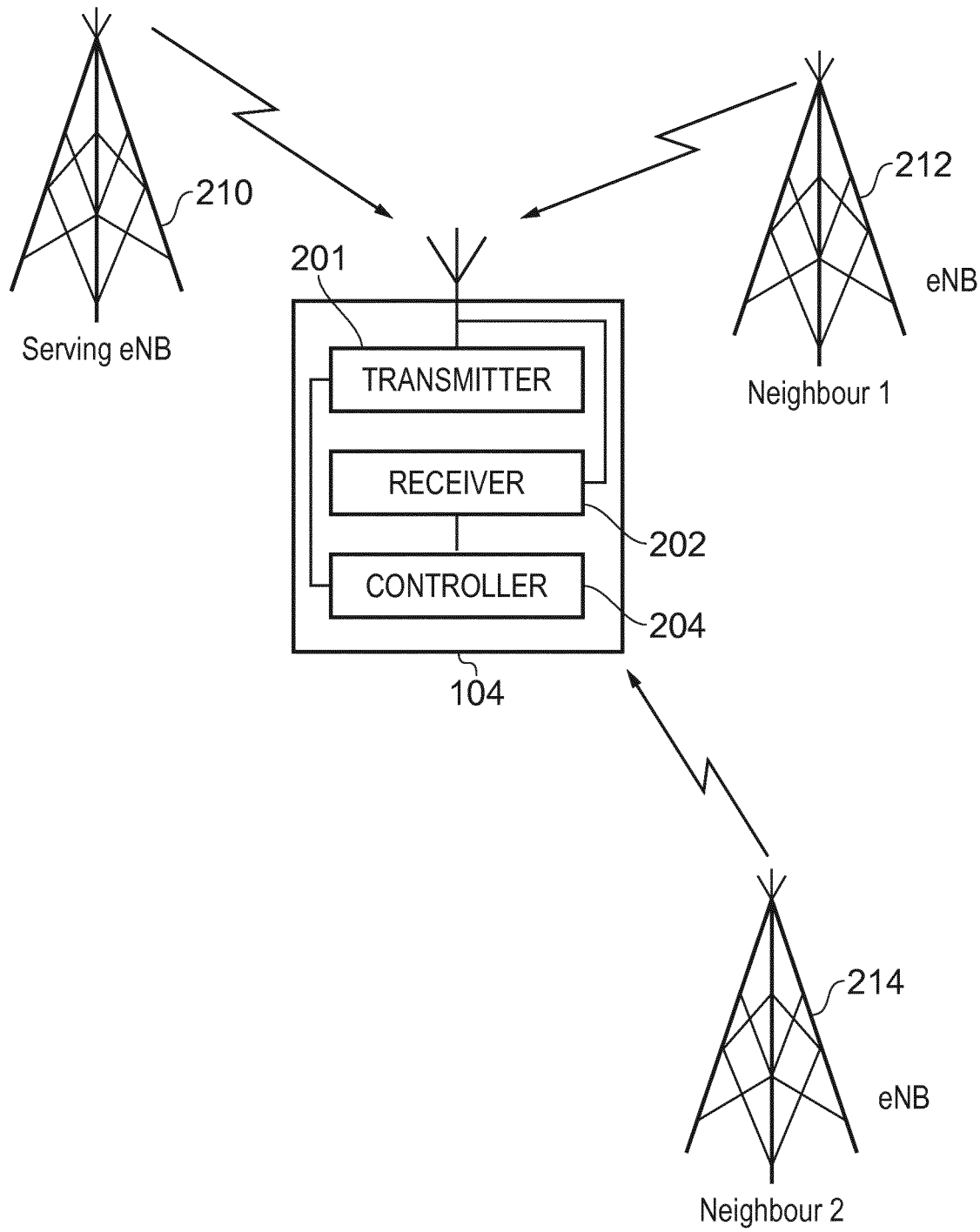
FIG. 2 is a schematic representation and part block diagram showing an arrangement in which a UE receives signals from a serving eNB and two neighbour eNBs.

FIG. 2 provides a schematic representation of a conventional arrangement in which one of the communications devices 104 shown in FIG. 1 is configured to perform a reselection technique in which the communications device 104 selects a neighbour cell to attach to for receiving downlink communications.

As shown in FIG. 2 the communications device 104 includes a transmitter circuit 201, a receiver circuit 202 and a controller circuit 204. The controller circuit 204 controls the transmitter circuit and the receiver circuit to transmit and receive signals via a wireless access interface performed by a radio network part of a mobile communications network. The radio network part may include a plurality of infrastructure equipment such as eNB's as shown in FIG. 1. As shown in FIG. 2, three infrastructure equipment are shown, 210, 212, 214.

In FIG. 2, each of the eNBs 210, 212, 214, provides a single coverage area (or cell), such as the cells 103 of FIG. 1. In some situations, a base station or eNB, such as eNB 210 may generate multiple coverage areas or cells (not shown). Whether or not they are generated by the same eNB, cells may overlap in their geographic coverage, and may use the same or different frequency and/or time resources.

In the following description, it is assumed that each eNB generates one cell and hence the terms eNB and cell are used interchangeably. However it will be readily apparent that the embodiments described herein are equally applicable regardless of the number of cells generated by an eNB.

According to the example illustrated in FIG. 2 the communications device 104 is currently camped on a serving eNB 210. That is to say the communications device 104 has selected the serving eNB 210 in order to receive downlink signals should these be transmitted by the wireless communications network and/or to initiate uplink communications should the need arise. As such, at any given instant, the UE 104 may or may not have an active connection with serving eNB 210 (in other words, there may be no ongoing data transfer in either the uplink or downlink). According to a conventional arrangement the serving eNB is identified by the network with respect to the communications device 104 by storing an indication of the serving eNB 210 in mobility management entity forming part of the communications core network 102.

Cells generated by eNBs 212, 214, which are not the serving cell may include neighbour cells. These neighbour cells may be identified to the UE by means of signalling from the serving eNB 210. Additionally or alternatively, these cells may be identified autonomously by the UE.

In accordance with a conventional arrangement the communications device 104 performs measurements of neighbour cells which are transmitting signals such as synchronisation signals or broadcast signals including cell-specific reference signals which can be measured by the communications device 104 using the receiver 202.

The communications device 104 monitors signals transmitted by the serving eNB 210 such as from the SIB or beacon transmissions and determines a received signal strength metric of the serving cell.

The received signal strength metric may be for example a Reference Signal Received Power (RSRP) or Received Signal Strength Indicator (RSSI) which are measurements used in LTE. The RSSI is a measure of the total received power observed only in OFDM symbols containing reference symbols for an antenna port in the measurement bandwidth over N reference Blocks. RSRP is defined as the linear average over the power contributions of the resource elements which carry cell-specific reference signals. The signal strength metric may be a metric indicative of the path loss incurred by signals transmitted by an eNB (such as serving eNB 210) and received by the communications device 104. As such, the signal strength metric may indicate that there is a high likelihood that signals transmitted by eNB 210 will be received with sufficient received signal power by communication device 104's receiver circuit 202 that error-free or at least a low error rate decoding of encoded data therein is possible and, similarly, that signals transmitted by communication device 104's transmitter circuit 201 can be received and decoded by eNB 210.

In some examples of NB-IoT devices, repetition coding is used in which signals are transmitted repeatedly in order to improve a likelihood of correctly receiving the data which they are carrying. As such a so-called 'coverage extension' is achieved for such devices. However this can mean that such devices are operating at relatively low signal to noise ratios, which can affect a cell reselection procedure.

The communications device 104 compares the determined received signal strength metric of the serving cell with respect to a predetermined threshold. Only if the metric falls below this predetermined threshold does the communications device begin to monitor signals transmitted by the neighbour eNB's 212, 214 in order to determine whether the communications device should reselect one of these eNB's, that is to say, should perform the actions necessary for the selected one of the eNBs 212, 214 to become the communication device's serving eNB.

In some examples, these actions may include identifying to the communications network that the communications device has selected the one of the eNBs 212, 214 as its new serving eNB and can receive signals from this reselected cell if the communications network wishes to transmit signals or data to the communications device 104. In some examples these actions may be conditional on an identifier associated with the selected one of the eNBs being different from a corresponding identifier associated with the serving cell. In some examples, these actions may include identifying to an entity within the core network 102 the identifier associated with the selected one of the eNBs.

Figure 3:
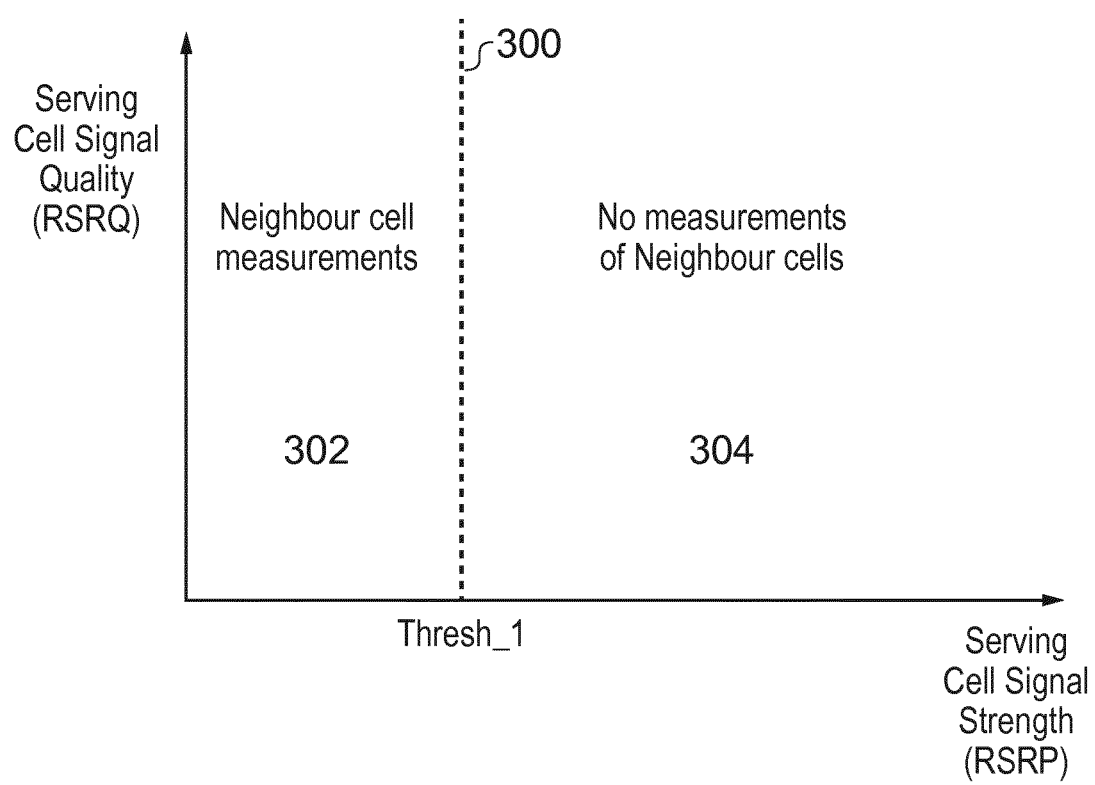
FIG. 3 is a graphical illustration representative of a scheme according to an LTE standard by which a UE determines whether or not to perform neighbour cell measurements, based on a serving cell signal strength.

FIG. 3 provides a graphical representation of a conventional arrangement in which the communications device 104 determines whether or not it should perform measurements of neighbour cells. FIG. 3 provides a graphical plot of possible signal quality and signal strength metrics based on the measurements of signals transmitted by the serving eNB 210 and received by the receiver circuit 202.

The received signal strength metric may be, for example, RSRP as described above. The signal quality metric may be an Reference Signal Received Quality (RSRQ) metric, defined as the ratio N×RSRP/(E-UTRA carrier RSSI), wherein N is the number of resource blocks of the E-UTRA carrier RSSI measurement bandwidth. The signal quality metric may indicate the absolute or relative (with respect to the strength of the desired signal from e.g. serving eNB 210) extent of interference detected in the signal received by the receiver 202 of communications device 104. The metric may be an Squal metric, defined as Qqualmeas−Qqualmin−Pcompensation−Qoffset in accordance with 3GPP TS 36.304 v14.2.0.

As shown in FIG. 3 a threshold 300 is shown with respect to the signal strength of the serving cell. If the signal strength of the received signals has for example calculated in accordance with an RSRP measurement falls below the threshold 300 then the metrics associated with the signals received from the serving cell form part of a region 302 in which the communications device 104 begins to measure signals received from the neighbour eNBs 212, 214 in order to determine whether or not to perform cell reselection. If however the RSRP or signal strength value received by the receiver circuit 202 is above the threshold 300 then no measurements are performed of the signals transmitted by the neighbour cells because the strength of the signal received from the serving cell 210 is sufficient for the communications device to transmit or receive signals to the mobile communications network.

Figure 4:
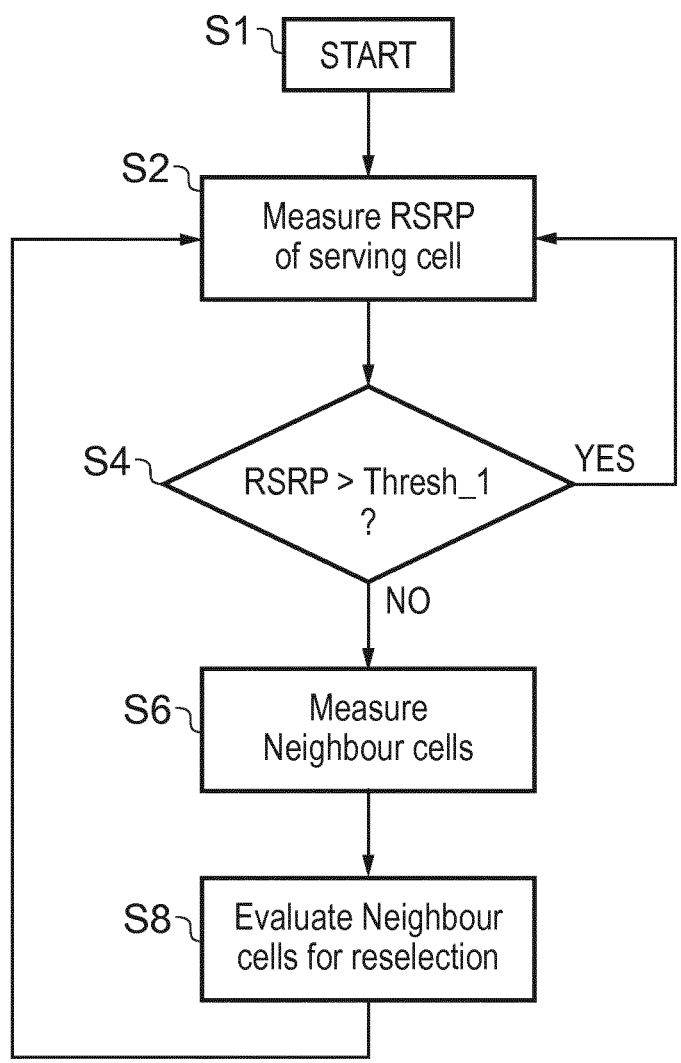
FIG. 4 is a flow diagram illustrating a process according to the LTE standard by which a UE carries out serving cell measurements and neighbour cell measurements according to the scheme illustrated in FIG. 3, and evaluates the neighbour cells for reselection.

A flow diagram representing the operation of the communications device in order to perform a conventional cell reselection is shown in FIG. 4. FIG. 4 will be briefly summarised as follows:

S1: At a starting operation a communications device proceeds to step S2 to perform measurements of the RSRP value of the serving cell provided for example by the serving eNB 210.

S4: The signal strength measurements received by the receiver unit of circuit 202 are compared to a predetermined threshold Thresh_1. Thresh_1 may correspond to an S-IntraSearchP parameter. The signal strength measurement may be evaluated as Srxlev=Qrxlevmeas−Qrxlevmin−Pcompensation−Qoffsettemp in accordance with an LTE standard, such as 3GPP TS 36.304, where Qrxlevmin may be a minimum required signal level for a cell to be suitable to camp on (i.e. act as serving cell). If the RSRP signal strength value exceeds the predetermined threshold Thresh_1 then processing proceeds to step S2 in order to continue to monitor the signal strength of signals received from the serving cell. In some examples a delay may be incurred before proceeding back to S4 in order to re-evaluate the received signal strength measurements or RSRP with respect to the threshold Thresh_1.

S6: If however the evaluation at step S4 the signal strength or RSRP is determined to be below the threshold Thresh_1 then the communications device 104 begins to perform measurements of the signals received from one or more neighbour cells provided by the neighbour eNBs 212, 214.

Depending on the relative location of the device 104 and eNBs 212 and 214, the device may not be able to identify any signals as having been transmitted by the neighbour eNBs. Alternatively, the device may be able to identify and measure one or more metrics associated with the transmissions from eNB 212 and/or eNB 214. The measurements of the neighbour cells may be signal strength measurements, signal quality measurements, or any other measurement appropriate to form the basis of a determination as to whether a particular neighbour cell should be selected as a new serving cell for the communications device.

The terms "measure neighbour cells" or "measure signals received from a neighbour cell" and the like may, therefore, refer to the step of attempting to identify signals associated with one or more candidate cells (e.g. transmitted by a respective eNB) for reselection, as well as measuring one or more properties of such signals if any are identified.

S8: The controller circuit of the eNB 104 performs an evaluation of the neighbour cell measurements. The device 104 determines whether it should select any of the identified neighbour cells (which may be provided by the neighbour eNBs 212, 214) in order to receive downlink communications or effectively camp on to this cell. In other words, the device 104 determines whether to perform cell reselection to an identified neighbour cell. The determination of whether it should select any neighbour cell to be a new serving cell (i.e. perform cell reselection) may be in accordance with a conventional reselection algorithm, such as those defined in 3GPP TS 36.304 for LTE and NB-IoT communications systems.

EXAMPLE EMBODIMENTS

Figure 5:
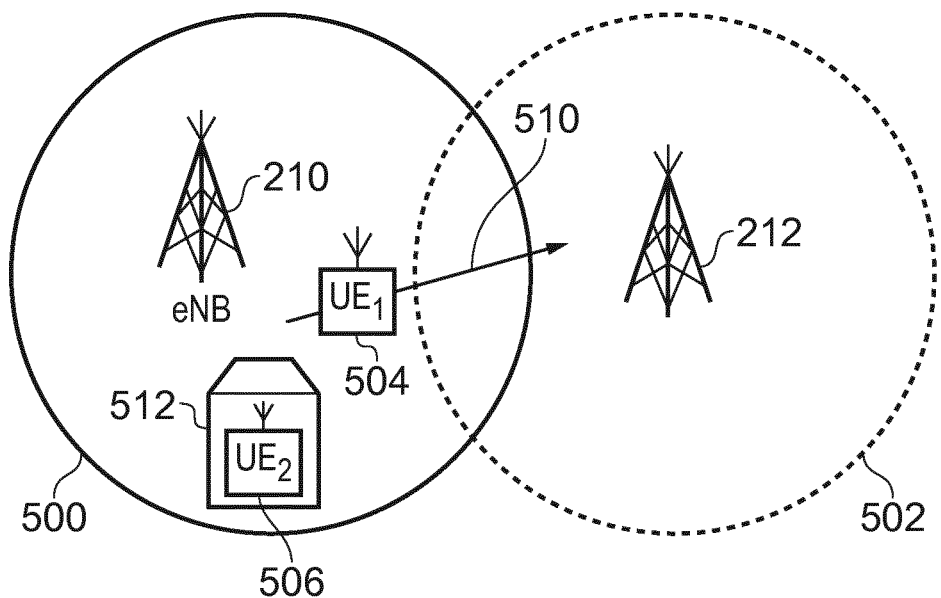
FIG. 5 is a schematic representation of a first UE moving away from a first eNB towards a second eNB, and a second UE which remains stationary in an indoor environment within coverage of the first eNB.

FIG. 5 provides an illustrative example with which the present technique finds application in order to perform a more efficient way of cell reselection. As shown in FIG. 5, two cells 500, 502 are shown which are formed by two eNBs or infrastructure equipment 210, 212. As for the example shown in FIG. 2, a first eNB 210 forms a serving cell to two communications devices 504, 506. The second eNB 212 forms a neighbour eNB and therefore forms the neighbour cell 502. As shown in FIG. 5, the first UE 504 is mobile as represented by an arrow 510 and is moving away from the serving eNB 210 towards the neighbour eNB 212. In contrast the second UE 506 is in an indoor environment because it is installed or present within a house or building 512. As a result of the relative positions of the UE's 504, 506 the signal strength of received signals in the form for example of RSRP is illustrated by the graphical plot shown in FIG. 6.

Figure 6:
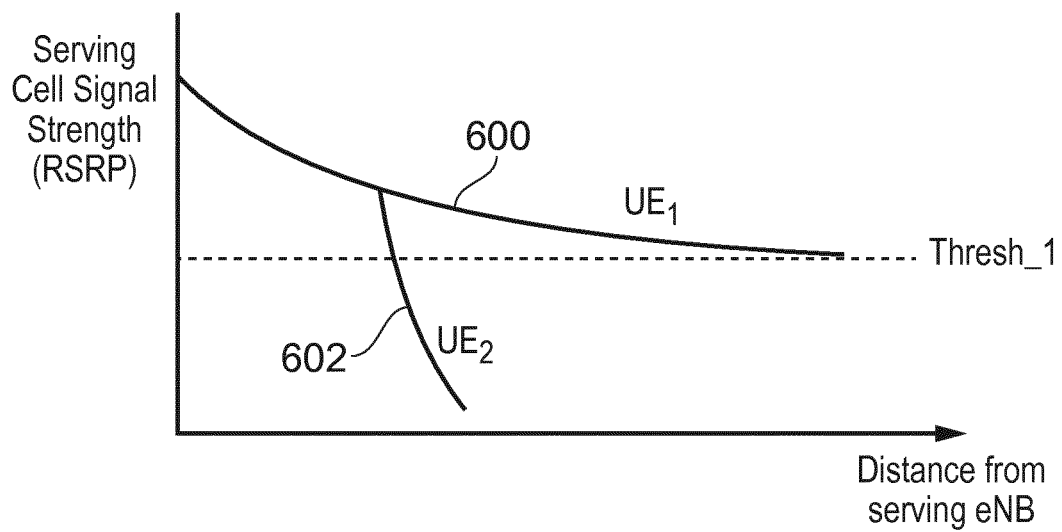
FIG. 6 is a graphical illustration of the measured serving cell received signal strength (RSRP) as measured by the first and second UEs of FIG. 5, as a function of distance from the first (serving) eNB.

FIG. 6 provides a graphical plot of signal strength or RSRP value associated with the signals transmitted by eNB 210, with respect to distance from the serving eNB 210. As shown by first plot 600 for the first UE 504, there is a decline in signal strength value as the UE 504 moves away from the serving eNB 210. However the signal strength only gradually approaches the predetermined threshold Thresh_1, below which device 504 triggers a process in which it monitors the signal strength of the neighbour cells (such as neighbour cell 502) and enters a situation corresponding to region 302 of FIG. 3. In contrast the second UE 506 experiences a sudden decline in signal strength or RSRP value with respect to distance because the second UE 506 moves within the house 512 which means that it observes significantly greater path loss with respect to the communications link between it and eNB 210. Since it determines that the RSRP value associated with the serving cell has fallen below the threshold Thresh_1, it is in a situation corresponding to region 302 of FIG. 3, and device 506 initiates the measurement and evaluation of signals received from neighbour cells.

As can be seen from FIGS. 5 and 6, neither device 504 nor device 506 is served effectively by the existing neighbour cell reselection approach. Device 504 is entering coverage of cell 502, but because it determines that the signal strength metric associated with its serving cell remains above the threshold Thresh_1, it does not initiate the measurement and/or evaluation of the signals received from eNB 212 providing cell 502, even though cell 502 provided by eNB 212 is a more appropriate cell. Although it is still able to obtain service from cell 500, it will require higher transmit power for UE 504 to transmit at a given data rate to eNB 210 than it would if it were to transmit to eNB 212. Furthermore, transmissions between device 504 and eNB 210 will give rise to unnecessary levels of interference to other devices operating on the same frequency (which may include eNB 212). This may in turn reduce the overall system capacity (i.e. considering the transmissions of a plurality of eNBs and associated devices).

On the other hand, device 506 is required to perform neighbour cell measurements based on the high path loss experienced by signals from eNB 210. However, in this case, it is already camped on the most appropriate cell, and (since it is stationary) is unlikely to determine that any other cell is more appropriate in the future.

When applied to radio technologies provided enhanced coverage, such as in accordance with a NB-IoT standard, which may provide coverage enhancements of up to 20 dB compared to conventional LTE, the measurement threshold Thresh_1 may be set to a relatively low absolute value to ensure that indoor/stationary UEs are not required to continuously measure. While a low threshold may address the problems described above in respect of device 506, it exacerbates the problems described above, related to device 504.

Some embodiments of the present technique to enhance the neighbour cell measurement process recognise that when a UE such as device 504 moves from a serving cell (such as cell 500) towards a neighbouring cell (such as cell 502), both the measured signal strength (e.g. RSRP) and signal quality (e.g. RSRQ) of the signals received from the serving cell 500 will drop; however, the signal quality may drop more quickly due to the effect of interference from the neighbour cell.

Some example embodiments of the present technique can enhance a neighbour cell measurement process by arranging a rate at which neighbour cell measurements in response to a requirement to more quickly evaluate neighbour cells to perform more urgently a cell reselection process. Furthermore the urgency with which cell reselection is required may depend on one or both of the path loss and interference which affects signals transmitted by a serving eNB and which are received by a device.

Figure 7:
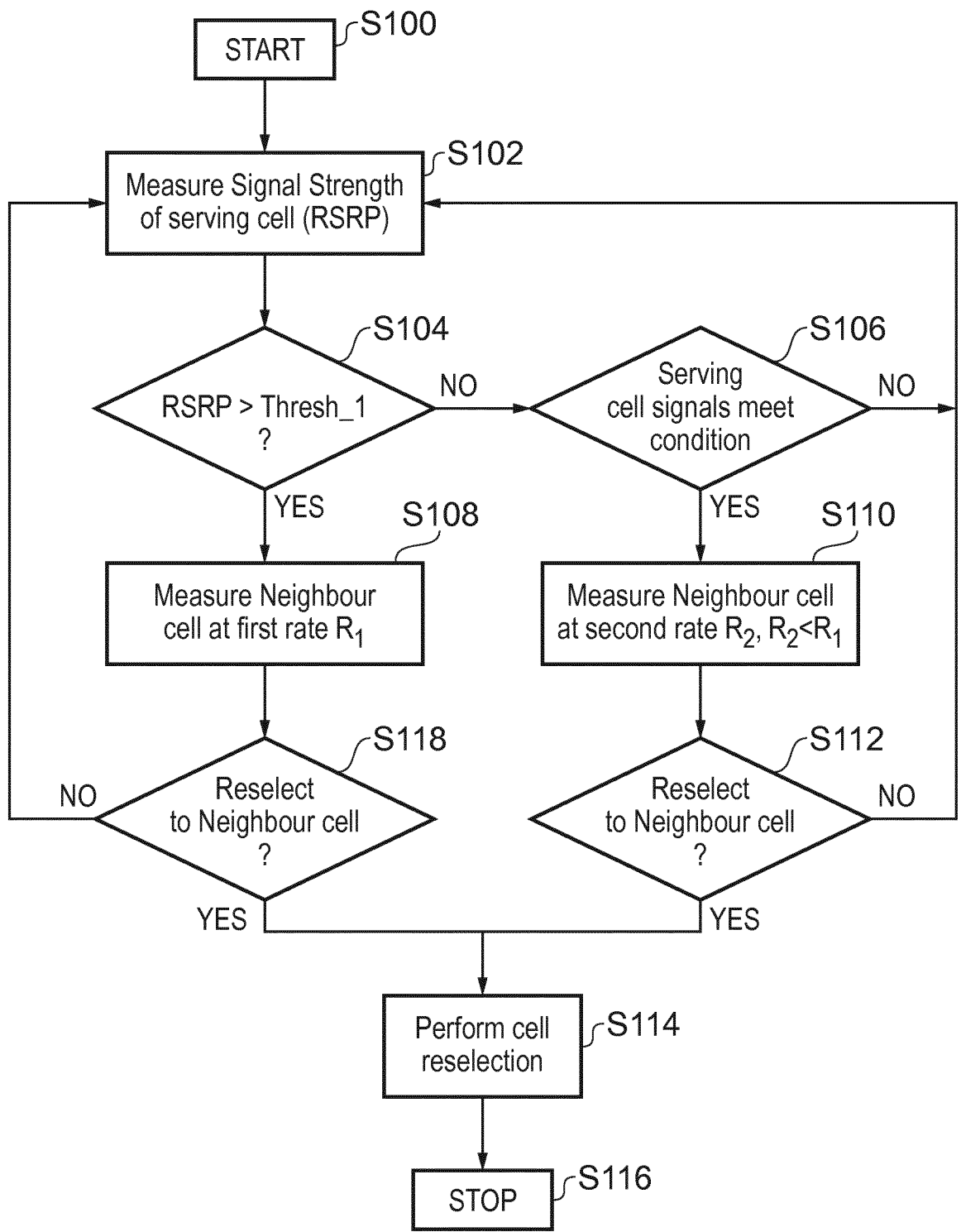
FIG. 7 is a flow diagram illustrating a process according to an embodiment of the present technique by which a UE carries out neighbour cell measurements, and evaluates the neighbour cells for reselection.

Embodiments of the present technique can provide a more efficient cell reselection process which reduces the power consumption of a communications device and also provides an earlier measurement of neighbour cell signals so that the communications device can more quickly reselect a neighbour cell if there is some degradation in the received signal strength from the serving cell. FIG. 7 provides an example block diagram of the operation of the communications device such as that shown in FIG. 2 but according to an embodiment of the present technique. FIG. 7 is summarized as follows:

S100—At the start the communications device is already attached to or camped on a serving eNB or a serving cell. The communications device may have ongoing data communications with the serving eNB, for example it may have established a bearer and/or may be encoding and transmitting data and/or receiving signals and decoding them to recover the transmitted underlying data. Alternatively the device may be in an idle state with no ongoing communications.

S102—The communications device first performs a measurement of the signal strength of signals received from the serving cell or serving eNode B such as in the form of the RSRP measurement. In some embodiments, step 102 may be substantially the same as step S2 of FIG. 4.

S104—The communications device then compares the RSRP value or signal strength of signals received from the serving cell with respect to a predetermined threshold Thresh_1 which may be the same threshold as the threshold 300 shown in FIG. 3 for a conventional arrangement. If the received signal strength is below the threshold then processing proceeds to step S106. If however the received signal strength or RSRP value is above the predetermined threshold then processing proceeds to step S108. In some embodiments step 104 may be substantially the same as step S4 of FIG. 4.

S106—If the RSRP signal strength value is above the threshold Thresh_1 then processing proceeds to evaluate the radio signals received from the serving cell and compare the results of this evaluation with respect to predetermined conditions. In accordance with these predetermined conditions, if these conditions are satisfied then processing proceeds to step S110. If not, then measurements of neighbour cells ceases if they are currently occurring and processing proceeds back to step S102 and the communications device continues to measure the signal strength of the serving cell.

In some embodiments, the measurements of neighbour cells ceases only after an elapsed time has occurred. The elapsed time may be calculated starting at the point where the evaluation at step S106 determined that the serving cell signal measurements no longer fulfilled the requirements for neighbour cell measurements to occur, or the elapsed time may be a minimum time, starting at the time where measurements were most recently started.

If the predetermined conditions in step S106 are satisfied then in step S110 the communications device begins to measure the signals received from the neighbour cells at a second rate. In some embodiments the second rate is different from the first rate as is performed in step S108. In some embodiments, the second rate is selected from the range of approximately once every second to approximately once every minute.

S108—If the RSRP or signal strength value is below the predetermined threshold Thresh_1 then the communications device begins to evaluate signals received from neighbour cells at a first rate.

Since the signal strength or RSRP value has fallen below the predetermined threshold Thresh_1 then the rate at which the signals are sampled or measured from the neighbour cells is at the first rate. As described above in respect of step S6, the evaluation of neighbour cell signals may include an identification step to determine if in fact, any signals can be identified has having been transmitted by a neighbour cell. The evaluation of neighbour cell signals may be include determining a signal strength (or other measure generally indicative of path loss), signal quality (or other measure generally indicative of a signal to noise ratio, a signal to interference ratio, or an absolute interference measurement), or both, in respect of signals identified as being transmitted by a particular neighbour cell.

In some embodiments, the first rate is higher than the second rate. This is because the communications device is already in a position in which the signal strength has fallen below the predetermined threshold in which the communications device should consider reselecting another cell than the serving cell. In some embodiments, the first rate may be in accordance with the requirements of a conventional LTE or an NB-IoT standard. In some embodiments, the first rate may correspond to a gap between measurements in the order of a few milliseconds, for example, once every five milliseconds. In some embodiments, the first rate and the second rate are the same.

In some embodiments, the measurements of neighbour cells starts only after an elapsed time has occurred. The elapsed time may be calculated starting at the point where the evaluation at step S106 or step S104 determined that the serving cell signal measurements fulfilled the relevant criteria, or the elapsed time may be a minimum time, starting at the time where measurements were most recently stopped.

S112—Based on the measurements received or evaluated from the neighbour cells, the communications device then determines if it should reselect to a neighbour cell based on these measurements acquired at the second rate R2. If no, then processing proceeds back to S102 but if yes then processing proceeds to step S114 in which the communications device performs cell reselection and processing stops at S116.

S118—If the measured values of the neighbour cells signal strength at the first rate indicate that cell reselection should be performed to select a neighbour cell then again processing proceeds from step S118 to perform cell reselection in step S114. Otherwise processing proceeds back to the measured signal strength of the serving cell in step S102. In some embodiments, step S118 proceeds in a similar manner to step S8 of FIG. 4.

The determination that a neighbour cell meets the criteria for reselection may be based the absolute values of the measurement of signals received from the neighbour cell or the relative values of the measurements (compared to those of either the serving cell, other neighbour cells, or both). The neighbour cell reselection criteria may be based on a ranking of cells (which may include the serving cell). The reselection criteria may be the same for both steps S112 and S118, in which case the determination as to whether the reselection criteria are met may be made without regard to whether the measurements were obtained at the first rate R1 or at the second rate R2. In some embodiments, the determination as to whether the reselection criteria are met may be made based on one or more measurements obtained at the first rate R1 (e.g. obtained as part of step S108) and one or more measurements obtained at the second rate R2 (e.g. obtained as part of step S110). In some embodiments, the reselection criteria for steps S112 and S118 may differ in light of the different rates at which measurements are obtained. Reselection may be based on one or more parameters in addition to the signal strength and/or signal quality, and may include restrictions (e.g. by means of hysteresis offsets or timing constraints) to avoid reselection ping-pong whereby a device repeatedly changes serving cell with high frequency.

Cell reselection criteria may include one or more of an absolute threshold applicable to the signal strength of a neighbour cell, an absolute threshold applicable to the signal quality of a neighbour cell, a relative threshold comparing the signal strength of a neighbour cell with the signal strength of the serving cell, a relative threshold comparing the signal strength of a neighbour cell with the signal quality of the serving cell, a ranking algorithm, an algorithm based on absolute priorities (which may be individual priorities applicable to the device, or priorities applicable to all devices in the serving cell).

The Cell reselection criteria may be based on a plurality of comparable measurements, which are combined by averaging or filtering. The cell reselection criteria may include a time threshold, such that the criteria must be fulfilled for a continuous time period exceeding the time threshold.

S114—If in either step S112 or step S118 the device determines that a neighbour cell fulfils the neighbour cell reselection criteria, then control passes to step S114 and the device performs cell reselection. That is to say, the device performs the necessary steps to receive service in the selected neighbour cell. This may include one or more of receiving and decoding system information of the neighbour cell, performing an update to inform the network of the cell reselection, and updating the internal state of the device to reflect the cell reselection.

S116—On completion of the cell reselection procedure, the device may start the entire process from step S100, with the newly-selected cell being the serving cell.

Figure 8A:
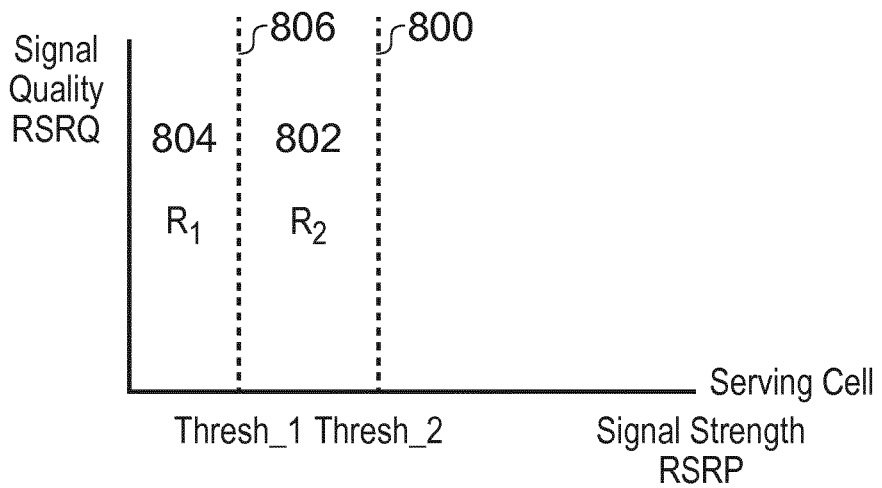
FIGS. 8A, 8B and 8C are graphical illustrations depicting schemes according to embodiments of the present technique, corresponding to the flow diagram of FIG. 7, illustrating a rate at which neighbour cell measurements are performed based on a strength and (in some embodiments) quality of signals received from the serving cell.
Figure 8B:
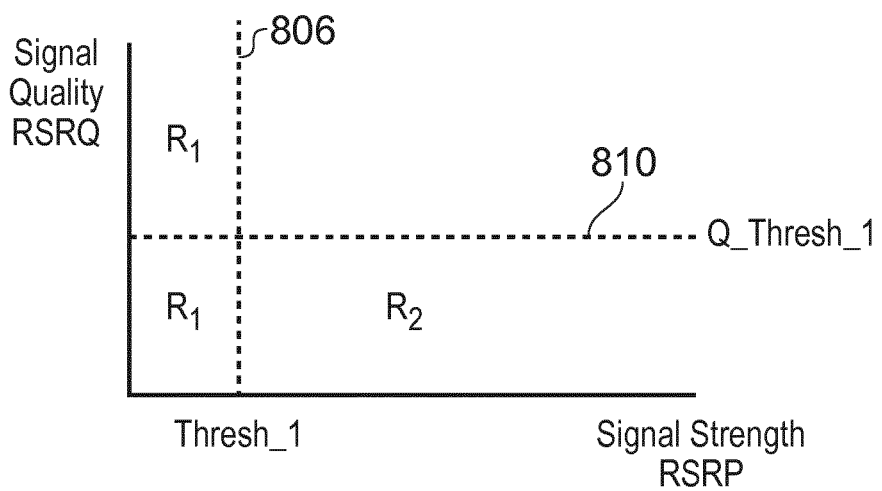
Figure 8C:
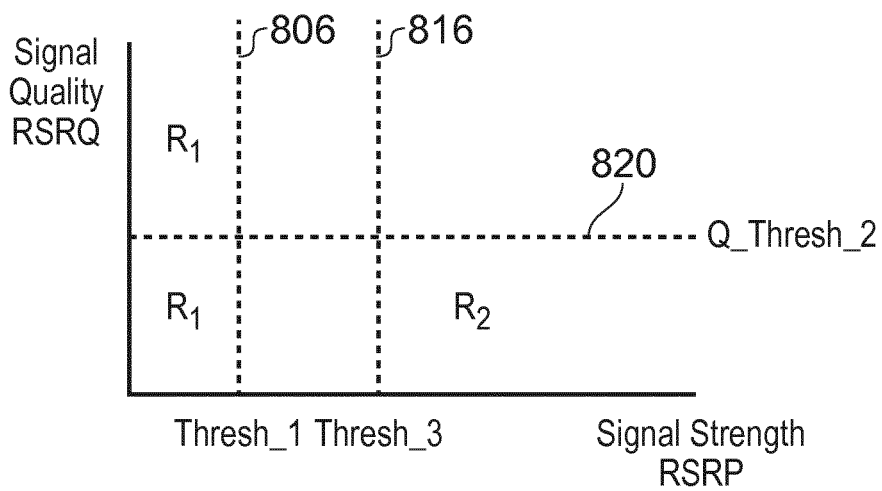

FIGS. 8a, 8b and 8c provide graphical representations of the relative rates of sampling of the measured neighbour cell signal strength performed by the steps S108 and S110 shown in FIG. 7 and the corresponding conditions (as evaluated in steps S104 and S106) in which they are applicable. As shown in FIG. 8a, if the signal strength or RSRP value of the serving cell falls below the second threshold Thresh_2 800 (which is higher than the first threshold Thresh_1 806) the signal strength of the neighbour cells is sampled at the second rate 802 which is slower than the first rate R1 804. Neighbour cell measurements are evaluated at the first rate if the signal strength or RSRP value is below the first threshold Thresh_1 806.

FIG. 8b provides a further example in which the communications device performs the measurements of the neighbour cells at the second sampling rate only if the signal strength or RSRP of received signals from the serving cell is above the first threshold Thresh_1 806 and the signal quality or the RSRQ of the signals received from the serving cell is below a quality threshold Q_Thresh_1 810.

In the third example shown in FIG. 8c, if the strength or RSRP of signals received from the serving cell are above the first threshold Thresh_1 806 but below a third threshold Thresh_3 816 (higher than the first threshold Thresh_1 806) then no measurements are performed whereas if the signal quality or RSRQ value is below a second threshold Q_Thresh_2 820 and the strength or RSRP of signals is above the third threshold Thresh_3 816 then the signals are measured of the neighbour cells at the second rate R2.

In some embodiments, Thresh_1 is set to ensure that the device is, with high likelihood, able to obtain service from the serving cell when the measured RSRP of the serving cell is at or above Thresh_1.

In some embodiments, Thresh_2 or Thresh_3 is set such that the device is likely to initiate measurements of neighbour cells once it is able to obtain better service (e.g. to be able to transmit at the same data rate using lower transmit power) from a neighbour cell than from the serving cell.

In some embodiments, a threshold may be adapted based on the signal strength or signal quality of the serving cell crossing another threshold. For example, with respect to the conditions illustrated in FIG. 8B, in some embodiments, Thresh_1 is increased (e.g. by a predetermined factor) when the signal quality (RSRQ) falls below Q_Thresh_1.

In some embodiments, the rate of measurements R1 and R2 are equal, but a third rate (higher than rates R1 and R2 and, in some embodiments, equal to the rate at which measurements occur according to a conventional arrangement) applies if and only if both a signal strength measurement (e.g. RSRP) and a signal quality measurement (e.g. RSRQ) fall below their respective thresholds (e.g. Thresh_1 and Q_Thresh_1 respectively of FIG. 8B).

In some embodiments in accordance with the scheme illustrated in FIG. 8C, the third threshold Thresh_3 816 is set such that, with increased likelihood, indoor devices receive signals from the serving cell with an RSRP lower than the third threshold, while devices which are outdoors receive signals from the serving cell with an RSRP greater than the third threshold.

In some embodiments, some or all of the thresholds may be predetermined and specified in an appropriate specification, for example 3GPP TS 36.304. In such embodiments, the thresholds may be specified as being relative to a threshold which is transmitted in broadcast signalling by the serving cell.

In some embodiments, some or all of the thresholds are transmitted in broadcast signalling by the eNB associated with the serving cell, such as by eNB 210. Each threshold may be signalled explicitly (e.g. based on encoding an absolute value) or relatively (e.g. where the difference between two thresholds is encoded), or determined according to a predetermined relationship, for example, Thresh_2 may be defined as being three times Thresh_1.

In some embodiments, the evaluations of the neighbour cell signals occur periodically in accordance with a rate determined according to the descriptions above. In some embodiments, the evaluation of the reselection criteria (e.g. in steps S118 and S112 of FIG. 7) occur more or less frequently than the evaluation of the serving cell signal in step S102.

In some embodiments, events which are described as happening "at a rate" or similar, may occur periodically. In some embodiments, events may occur at times scheduled by the controller 204 which are sufficiently close together to ensure that outcomes (such as cell reselection) may occur within a predetermined time starting from a time at which certain predetermined conditions are met. This may include the possibility that such events occur at an instantaneous rate which is higher or lower than a rate described herein.

Various aspects and features of the present technique are defined in the appended claims. Various modifications may be made to the example embodiments as disclosed above as appreciated by the skilled person within the scope of the appended claims. Various further example embodiments and features are defined in the following numbered paragraphs:

Paragraph 1. A method of performing cell reselection by a wireless communications device, the method comprising:
  measuring a signal strength of radio signals received from a serving cell,
  determining whether the signal strength of the signals received from the serving cell is lower than a first predetermined signal strength threshold,
  if the signal strength is lower than the first predetermined signal strength threshold measuring signals received from a neighbour cell operating on the same frequency as the serving cell to generate neighbour cell measurements at a first rate, and
  in accordance with the neighbour cell measurements of the neighbour cell generated at the first rate determining whether to reselect to the neighbour cell, and
  if the signal strength of the signals received from the serving cell is greater than the first predetermined signal strength threshold and the radio signals received from the serving cell satisfy one or more predetermined conditions based on at least one of the measured signal strength of the signals received from the serving cell and a measured signal quality of the signals received from the serving cell, measuring the signals received from the neighbour cell to generate neighbour cell measurements at a second rate, and in accordance with the neighbour cell measurements of the neighbour cell generated at the second rate determining whether to reselect to the neighbour cell.

Paragraph 2. A method of paragraph 1, wherein the second rate is less than the first rate.

Paragraph 3. A method of paragraph 1, wherein the second rate is different to the first rate.

Paragraph 4. A method of paragraph 1, 2 or 3, wherein the one or more predetermined conditions of the radio signals received from the serving cell for measuring the signals received from the neighbour cell at the second rate, include a condition that the measured signal strength of the radio signals received from the serving cell is higher than the first predetermined signal strength threshold and a condition that the measured signal strength of the radio signals received from the serving cell is lower than a second predetermined signal strength threshold.

Paragraph 5. A method of paragraph 1, 2 or 3, wherein the one or more predetermined conditions of the radio signals received from the serving cell for measuring the signals received from the neighbour cell at the second rate, include a condition that the measured signal strength of the radio signals received from the serving cell is higher than the first predetermined signal strength threshold and a condition that the measured signal quality of the signals received from the serving cell is lower than a first predetermined signal quality threshold.

Paragraph 6. A method of paragraph 5, wherein the one or more predetermined conditions of the radio signals received from the serving cell for measuring the signals received from the neighbour cell at the second rate, include a condition that the measured signal strength of the radio signals received from the serving cell is higher than a third predetermined signal strength threshold and the measured signal quality of the signals received from the serving cell is lower than a second predetermined signal quality threshold.

Paragraph 7. A method of any of paragraphs 1 to 6, comprising determining that the signal strength of the radio signals received from the serving cell is greater than the first predetermined signal strength threshold and determining that the signals received from the serving cell do not satisfy the predetermined conditions, and if the signal strength of the radio signals is greater then the first predetermined threshold and the signals received from the serving cell do not satisfy the predetermined conditions, stopping the measurement of the signals received from the neighbour cell.

Paragraph 8. A method of any of paragraphs 1 to 7, wherein the neighbour cell measurements comprise at least one of a signal strength measurement and a signal quality measurement.

Paragraph 9. A method of any of paragraphs 2 to 8, comprising:
  receiving from an infrastructure equipment associated with the serving cell at least one of the first predetermined signal strength threshold, the second predetermined signal strength threshold, the third predetermined signal strength threshold, the first predetermined signal quality threshold and the second predetermined signal quality threshold.

Paragraph 10. A communications device configured to transmit radio signals to and/or receive radio signals from an infrastructure equipment of a wireless communications network, the communications device comprising
  a receiver circuit configured to receive radio signals transmitted by the infrastructure equipment via a wireless access interface,
  a transmitter circuit configured to transmit radio signals to the infrastructure equipment via the wireless access interface, and
  a controller circuit configured to control the transmitter circuit and the receiver circuit to transmit data to or receive data from the wireless communications network via the infrastructure equipment, wherein the controller circuit is configured to control the receiver circuit
  to measure signals strength of the radio signals received from a serving cell formed by an infrastructure equipment of the wireless communications network,
  to determine whether the signal strength of the signals received from the serving cell is lower than a first predetermined signal strength threshold, and
  if the signal strength is lower than the first predetermined signal strength threshold measuring a signal received from a neighbour cell operating on the same frequency as the serving cell to generate neighbour cell measurements of the neighbour cell at a first rate, and
  in accordance with the neighbour cell measurements of the neighbour cell generated at the first rate determining whether to reselect to the neighbour cell, and
  if the signal strength of the signals received from the serving cell is greater than the first predetermined signal strength threshold and the radio signals received from the serving cell satisfy one or more predetermined conditions based on at least one of the measured signal strength of the signals received from the serving cell and a measured signal quality of the signals received from the serving cell, to measure the signals received from the neighbour cell to generate neighbour cell measurements at a second rate, and in accordance with the neighbour cell measurements of the neighbour cell generated at the second rate to determine whether to reselect to the neighbour cell.

Paragraph 11. A communications device according to paragraph 10, wherein the second rate is less than the first rate.

Paragraph 12. A communications device according to paragraph 10, wherein the second rate is different to the first rate.

Paragraph 13. A communications device according to any of paragraphs 10, 11 or 12, wherein the one or more predetermined conditions of the radio signals received from the serving cell for measuring the signals received from the neighbour cell at the second rate include a condition that the measured signal strength of the radio signals received from the serving cell is higher than the first predetermined signal strength threshold and a condition that the measured signal strength of the radio signals received from the serving cell is lower than a second predetermined signal strength threshold.

Paragraph 14. A communications device according to any of paragraphs 10, 11 or 12, wherein the one or more predetermined conditions of the radio signals received from the serving cell for measuring the signals received from the neighbour cell at the second rate, include a condition that the measured signal strength of the radio signals received from the serving cell is higher than the first predetermined signal strength threshold and a condition that the measured signal quality of the signals received from the serving cell is lower than a first predetermined signal quality threshold.

Paragraph 15. A communications device according to any of paragraphs 10, 11 or 12, wherein the one or more predetermined conditions of the radio signals received from the serving cell for measuring the signals received from the neighbour cell at the second rate, include a condition that the measured signal strength of the radio signals received from the serving cell is higher than a third predetermined signal strength threshold and the measured signal quality of the signals received from the serving cell is lower than a second predetermined signal quality threshold.

Paragraph 16. A communications device according to any of paragraphs 10 to 15, wherein the controller circuit is configured to control the receiver circuit
  to determine that the signal strength of the radio signals received from the serving cell is greater than the first predetermined signal strength threshold and determining that the signals received from the serving cell do not satisfy the predetermined conditions, and
  if the signal strength of the radio signals is greater than the first predetermined threshold and the signals received from the serving cell do not satisfy the predetermined conditions, to stop the measurement of the signals received from the neighbour cell.

Paragraph 17. A communications device according to any of paragraphs 10 to 16, wherein the neighbour cell measurements comprise at least one of a signal strength measurement and a signal quality measurement.

Paragraph 18. A communications device according to any of paragraphs 10 to 16 wherein
  the controller circuit is configured to control the receiver circuit to receive from the infrastructure equipment at least one of the first predetermined signal strength threshold, the second predetermined signal strength threshold, the third predetermined signal strength threshold, the first predetermined signal quality threshold and the second predetermined signal quality threshold.

REFERENCES

[1] LTE for UMTS: OFDMA and SC-FDMA Based Radio Access, Harris Holma and Antti Toskala, Wiley 2009, ISBN 978-0-470-99401-6.
[2] "(draft) Email discussion report [97bis#31][NB-IoT] Cell reselection for NB-IoT", Ericsson, published on 3GPP TSG RAN WG2 email reflector, 18 Apr. 2017
[3] 3GPP TS 36.304
[4] R2-1702929 "Cell reselection issue for NB-IoT", China Mobile Communications (CMCC)

What is claimed is:

1. A method of performing cell reselection by a wireless communications device,
  the method comprising:
    measuring a signal strength of radio signals received from a serving cell,
    determining whether the signal strength of the signals received from the serving cell is lower than a first predetermined signal strength threshold,
    if the signal strength is lower than the first predetermined signal strength threshold measuring signals received from a neighbour cell operating on the same frequency as the serving cell to generate neighbour cell measurements at a first rate, and
    in accordance with the neighbour cell measurements of the neighbour cell generated at the first rate determining whether to reselect to the neighbour cell, and
    if the signal strength of the signals received from the serving cell is greater than the first predetermined signal strength threshold and the radio signals received from the serving cell satisfy one or more predetermined conditions based on at least one of the measured signal strength of the signals received from the serving cell and a measured signal quality of the signals received from the serving cell, measuring the signals received from the neighbour cell to generate neighbour cell measurements at a second rate, and in accordance with the neighbour cell measurements of the neighbour cell generated at the second rate determining whether to reselect to the neighbour cell.

2. A method of claim 1, wherein the second rate is less than the first rate.

3. A method of claim 1, wherein the second rate is different to the first rate.

4. A method of claim 1, wherein the one or more predetermined conditions of the radio signals received from the serving cell for measuring the signals received from the neighbour cell at the second rate, include a condition that the measured signal strength of the radio signals received from the serving cell is higher than the first predetermined signal strength threshold and a condition that the measured signal strength of the radio signals received from the serving cell is lower than a second predetermined signal strength threshold.

5. A method of claim 1, wherein the one or more predetermined conditions of the radio signals received from the serving cell for measuring the signals received from the neighbour cell at the second rate, include a condition that the measured signal strength of the radio signals received from the serving cell is higher than the first predetermined signal strength threshold and a condition that the measured signal quality of the signals received from the serving cell is lower than a first predetermined signal quality threshold.

6. A method of claim 5, wherein the one or more predetermined conditions of the radio signals received from the serving cell for measuring the signals received from the neighbour cell at the second rate, include a condition that the measured signal strength of the radio signals received from the serving cell is higher than a third predetermined signal strength threshold and the measured signal quality of the signals received from the serving cell is lower than a second predetermined signal quality threshold.

7. A method of claim 1, comprising
determining that the signal strength of the radio signals received from the serving cell is greater than the first predetermined signal strength threshold and determining that the signals received from the serving cell do not satisfy the predetermined conditions, and if the signal strength of the radio signals is greater then the first predetermined threshold and the signals received from the serving cell do not satisfy the predetermined conditions, stopping the measurement of the signals received from the neighbour cell.

8. A method of claim 1, wherein the neighbour cell measurements comprise at least one of a signal strength measurement and a signal quality measurement.

9. A method of claim 2, comprising:
receiving from an infrastructure equipment associated with the serving cell at least one of the first predetermined signal strength threshold, the second predetermined signal strength threshold, the third predetermined signal strength threshold, the first predetermined signal quality threshold and the second predetermined signal quality threshold.

10. A communications device configured to transmit radio signals to and/or receive radio signals from an infrastructure equipment of a wireless communications network, the communications device comprising
a receiver circuit configured to receive radio signals transmitted by the infrastructure equipment via a wireless access interface,
a transmitter circuit configured to transmit radio signals to the infrastructure equipment via the wireless access interface, and
a controller circuit configured to control the transmitter circuit and the receiver circuit to transmit data to or receive data from the wireless communications network via the infrastructure equipment, wherein the controller circuit is configured to control the receiver circuit
to measure signals strength of the radio signals received from a serving cell formed by an infrastructure equipment of the wireless communications network,
to determine whether the signal strength of the signals received from the serving cell is lower than a first predetermined signal strength threshold, and
if the signal strength is lower than the first predetermined signal strength threshold measuring a signal received from a neighbour cell operating on the same frequency as the serving cell to generate neighbour cell measurements of the neighbour cell at a first rate, and
in accordance with the neighbour cell measurements of the neighbour cell generated at the first rate determining whether to reselect to the neighbour cell, and
if the signal strength of the signals received from the serving cell is greater than the first predetermined signal strength threshold and the radio signals received from the serving cell satisfy one or more predetermined conditions based on at least one of the measured signal strength of the signals received from the serving cell and a measured signal quality of the signals received from the serving cell, to measure the signals received from the neighbour cell to generate neighbour cell measurements at a second rate, and in accordance with the neighbour cell measurements of the neighbour cell generated at the second rate to determine whether to reselect to the neighbour cell.

11. A communications device as claimed in claim 10, wherein the second rate is less than the first rate.

12. A communications device as claimed in claim 10, wherein the second rate is different to the first rate.

13. A communications device as claimed in claim 10, wherein the one or more predetermined conditions of the radio signals received from the serving cell for measuring the signals received from the neighbour cell at the second rate include a condition that the measured signal strength of the radio signals received from the serving cell is higher than the first predetermined signal strength threshold and a condition that the measured signal strength of the radio signals received from the serving cell is lower than a second predetermined signal strength threshold.

14. A communications device as claimed in claim 10, wherein the one or more predetermined conditions of the radio signals received from the serving cell for measuring the signals received from the neighbour cell at the second rate, include a condition that the measured signal strength of the radio signals received from the serving cell is higher than the first predetermined signal strength threshold and a condition that the measured signal quality of the signals received from the serving cell is lower than a first predetermined signal quality threshold.

15. A communications device as claimed in claim 10, wherein the one or more predetermined conditions of the radio signals received from the serving cell for measuring the signals received from the neighbour cell at the second rate, include a condition that the measured signal strength of the radio signals received from the serving cell is higher than a third predetermined signal strength threshold and the measured signal quality of the signals received from the serving cell is lower than a second predetermined signal quality threshold.

16. A communications device as claimed in claim 10, wherein the controller circuit is configured to control the receiver circuit
to determine that the signal strength of the radio signals received from the serving cell is greater than the first predetermined signal strength threshold and determining that the signals received from the serving cell do not satisfy the predetermined conditions, and
if the signal strength of the radio signals is greater than the first predetermined threshold and the signals received from the serving cell do not satisfy the predetermined conditions, to stop the measurement of the signals received from the neighbour cell.

17. A communications device as claimed in claim 10, wherein the neighbour cell measurements comprise at least one of a signal strength measurement and a signal quality measurement.

18. A communications device as claimed in claim 10, wherein
the controller circuit is configured to control the receiver circuit to receive from the infrastructure equipment at least one of the first predetermined signal strength threshold, the second predetermined signal strength threshold, the third predetermined signal strength threshold, the first predetermined signal quality threshold and the second predetermined signal quality threshold.

19. An infrastructure equipment of a wireless communications network, the infrastructure equipment comprising a receiver circuit configured to receive radio signals transmitted by a communications device via a wireless access interface, a transmitter circuit configured to transmit radio signals to the communications device via the wireless access interface, and a controller circuit configured to control the transmitter circuit and the receiver circuit to transmit data to or receive data from the communications device, wherein the controller circuit is configured to control the transmitter circuit to transmit a reference signal identifying a cell provided by the infrastructure equipment, to transmit an indication of a first signal strength threshold and at least one of an indication of a second signal strength threshold and an indication of a first signal quality threshold, wherein if a signal strength of the reference signal received by the communications device from the infrastructure equipment is less than the first signal strength threshold, the communications device is configured to generate neighbour cell measurements at a first rate and if the signal strength of the reference signal received by the communications device from the infrastructure equipment is greater than the first signal strength threshold and the reference signal received by the communications device from the infrastructure equipment satisfies one or more predetermined conditions based on at least one of the second signal strength threshold and the first signal quality threshold the communications device is configured to generate neighbour cell measurements at a second rate, and in accordance with the neighbour cell measurements of the neighbour cell to determine whether to reselect to the neighbour cell.

* * * * *